US009658053B2

(12) United States Patent
Medhat et al.

(10) Patent No.: US 9,658,053 B2
(45) Date of Patent: May 23, 2017

(54) SELF CALIBRATION FOR MIRROR POSITIONING IN OPTICAL MEMS INTERFEROMETERS

(71) Applicant: Si-Ware Systems, Cairo (EG)

(72) Inventors: Mostafa Medhat, Cairo (EG); Bassem Mortada, Cairo (EG); Ahmed Othman El Shater, Cairo (EG); Muhammed Nagy, Cairo (EG); Mina Gad Seif, Cairo (EG); Bassam A. Saadany, Cairo (EG); Amr N. Hafez, Cairo (EG)

(73) Assignee: Si-Ware Systems, Cairo (EG)

( * ) Notice: Subject to any disclaimer, the term of this patent is extended or adjusted under 35 U.S.C. 154(b) by 659 days.

(21) Appl. No.: 14/165,997

(22) Filed: Jan. 28, 2014

(65) Prior Publication Data

US 2014/0139839 A1 May 22, 2014

Related U.S. Application Data

(63) Continuation-in-part of application No. 13/044,238, filed on Mar. 9, 2011, now Pat. No. 8,873,125.
(Continued)

(51) Int. Cl.
*G01B 9/02* (2006.01)
*G02B 26/08* (2006.01)
(Continued)

(52) U.S. Cl.
CPC .......... *G01B 9/02068* (2013.01); *G01B 7/08* (2013.01); *G01B 9/02071* (2013.01); *G01J 3/45* (2013.01);
(Continued)

(58) Field of Classification Search
CPC .. G01B 9/02068; G01B 7/08; G01B 9/02071; G01J 3/45; G01J 3/4532; G01J 3/4535; G02B 26/0841
See application file for complete search history.

(56) References Cited

U.S. PATENT DOCUMENTS

| 4,444,501 A | 4/1984 | Schwiesow |
| 2003/0025982 A1 | 2/2003 | Wang et al. |

(Continued)

FOREIGN PATENT DOCUMENTS

| EP | 1327861 B1 | 3/2011 |
| WO | 2009120193 A1 | 10/2009 |
| WO | 2010023766 A1 | 3/2010 |

OTHER PUBLICATIONS

Price, Measurement of the Sodium D Emission Lines Using a Michelson Interferometer, 2008, available at https://www.phys.ksu.edu/personal/rprice/Michelson_Interferometer.pdf.*
(Continued)

*Primary Examiner* — Daniel Miller
(74) *Attorney, Agent, or Firm* — Loza & Loza, LLP; Holly L. Rudnick

(57) ABSTRACT

A Micro-Electro-Mechanical System (MEMS) interferometer provides for self-calibration of mirror positioning of a moveable mirror. The moveable mirror is coupled to a MEMS actuator having a variable capacitance. The MEMS interferometer includes a capacitive sensing circuit for determining the capacitance of the MEMS actuator at two or more known positions of the moveable mirror and a calibration module for using the actuator capacitances at the known positions to compensate for any drift in the capacitive sensing circuit.

21 Claims, 12 Drawing Sheets

Related U.S. Application Data

(60) Provisional application No. 61/311,966, filed on Mar. 9, 2010, provisional application No. 61/757,581, filed on Jan. 28, 2013.

(51) Int. Cl.
*G01B 7/06* (2006.01)
*G01J 3/45* (2006.01)
*G01J 3/453* (2006.01)

(52) U.S. Cl.
CPC .......... *G01J 3/4532* (2013.01); *G01J 3/4535* (2013.01); *G02B 26/0841* (2013.01); *G01B 2290/35* (2013.01)

(56) References Cited

U.S. PATENT DOCUMENTS

2011/0222067 A1    9/2011    Saadany et al.
2014/0139839 A1    5/2014    Medhat et al.

OTHER PUBLICATIONS

Cable, Calibration, A Technician's Guide, ISA Technician Series, 2005.*
International Searching Authority; International Search Report and Written Opinion; International Application No. PCT/US14/013399; Apr. 10, 2014; 13 pgs.
PCT/US2016/028144. Int'l Search Report & Written Opinion (Sep. 1, 2016). Applicant: Si-Ware Systems.

* cited by examiner

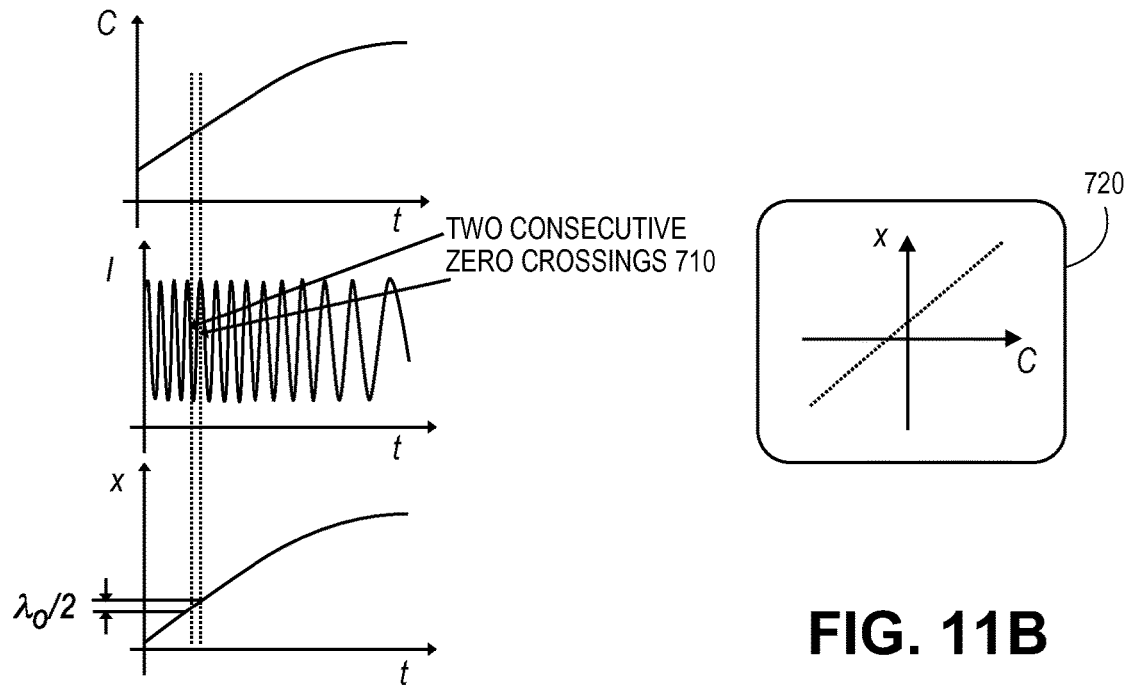
FIG. 11A
FIG. 11B
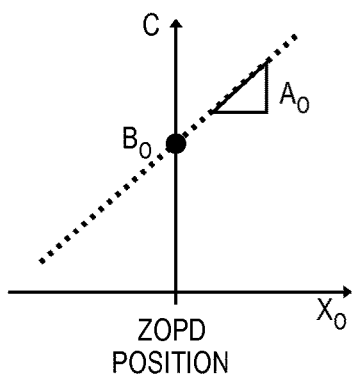
FIG. 12A
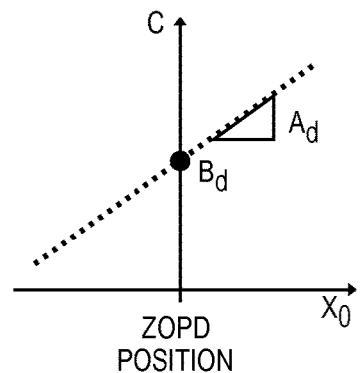
FIG. 12B

SELF CALIBRATION FOR MIRROR POSITIONING IN OPTICAL MEMS INTERFEROMETERS

CROSS REFERENCE TO RELATED PATENTS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:
  U.S. Provisional Application Ser. No. 61/757,581, entitled "Self Calibration for Mirror Positioning in Optical MEMS Interferometers," filed Jan. 28, 2013.

The present U.S. Utility Patent Application further claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:
  U.S. Utility application Ser. No. 13/044,238, entitled "Technique to Determine Mirror Position in Optical Interferometers," filed Mar. 9, 2011, pending, which claims priority pursuant to 35 U.S.C. §119(e) to the following U.S. Provisional Patent Application which is hereby incorporated herein by reference in its entirety and made part of the present U.S. Utility Patent Application for all purposes:
    U.S. Provisional Application Ser. No. 61/311,966, entitled "Electronics for MEMS-based systems: design issues and tradeoffs," filed Mar. 9, 2010.

BACKGROUND OF THE INVENTION

Technical Field of the Invention

The present invention relates in general to optical spectroscopy and interferometry, and in particular to the use of Micro Electro-Mechanical System (MEMS) technology in optical interferometers.

Description of Related Art

Micro Electro-Mechanical Systems (MEMS) refers to the integration of mechanical elements, sensors, actuators and electronics on a common silicon substrate through microfabrication technology. For example, the microelectronics are typically fabricated using an integrated circuit (IC) process, while the micromechanical components are fabricated using compatible micromachining processes that selectively etch away parts of the silicon wafer or add new structural layers to form the mechanical and electromechanical components. MEMS devices are attractive candidates for use in spectroscopy, profilometry, environmental sensing, refractive index measurements (or material recognition), as well as several other sensor applications, due to their low cost, batch processing ability and compatibility with standard microelectronics. In addition, the small size of MEMS devices facilitates the integration of such MEMS devices into mobile and hand held devices.

Moreover, MEMS technology, with its numerous actuation techniques, enables the realization of new functions and features of photonic devices, such as optical tenability and dynamic sensing applications. For example, by using MEMS actuation (electrostatic, magnetic or thermal) to control a movable mirror of a Michelson Interferometer, small displacements in the interferometer optical path length can be introduced, and consequently, a differential phase between the interfering beams can be obtained. The resulting differential phase can be used to measure the spectral response of the interferometer beam (e.g., using Fourier Transform Spectroscopy), the velocity of the moving mirror (e.g., using the Doppler Effect), or simply as an optical phase delay element.

A key component in the accuracy of such interferometers is determining the position of the moveable mirror. Traditionally, a laser and auxiliary interferometer have been used to measure the moving mirror position. However, introducing a bulky laser source and additional interferometer increases the size, cost and complexity of the interferometer system.

Therefore, there is a need for a mechanism to determine the moveable mirror position with reduced size, cost and complexity.

SUMMARY OF THE INVENTION

Embodiments of the present invention provide a Micro-Electro-Mechanical System (MEMS) apparatus for performing self-calibration of mirror positioning. The MEMS apparatus includes a movable mirror and a MEMS actuator having a variable capacitance that is coupled to the moveable mirror to cause a displacement thereof. The MEMS apparatus further includes a memory maintaining a table mapping capacitance of the MEMS actuator to position of the moveable mirror, a capacitive sensing circuit coupled to the MEMS actuator for sensing a current capacitance of the MEMS actuator, a digital signal processor for accessing the table to determine a current position of the moveable mirror based on the current capacitance of the MEMS actuator and a calibration module for determining respective actual capacitances of the MEMS actuator at two or more known positions of the moveable mirror to determine a correction amount to be applied to the current position of the moveable mirror. The digital signal processor further produces a corrected current position of the moveable mirror using the correction amount.

In one embodiment, the MEMS apparatus further includes a light source for producing an input beam having a known wavelength and the capacitive sensing circuit measures a capacitance variation as the moveable mirror moves through at least two zero crossings of an interference pattern produced as a result of the input beam and movement of the moveable mirror. The digital signal processor populates the table based on the capacitance variation and the interference pattern.

In a further embodiment, the calibration module compares the actual capacitances of the MEMS actuator to corresponding respective capacitances within the table at the two or more known positions to calculate respective errors between the measured actual capacitances and the corresponding capacitances within the table. In an exemplary embodiment, the table represents a capacitance sensing curve and the calibration module extrapolates a corrected capacitance sensing curve using the capacitance sensing curve and the calculated errors and uses the corrected capacitance sensing curve to determine the correction amount to be applied to the current position.

In another embodiment, the MEMS apparatus further includes a wide band light source for producing a wide band light beam. The capacitive sensing circuit determines a first measured capacitance at a first reference position of the moveable mirror corresponding to a center burst of an interference pattern produced as a result of the wide band light beam and movement of the moveable mirror and a second measured capacitance at a second reference position of the moveable mirror corresponding to zero actuation applied to the moveable mirror by the MEMS actuator. The calibration module uses the first measured capacitance at the first reference position and the second measured capacitance at the second reference position to determine the correction amount.

In yet another embodiment, the MEMS apparatus includes a fixed structure having a first stopper at a first end thereof and a second stopper at a second end thereof and an actuator arm coupled between the MEMS actuator and the moveable mirror, in which the actuator arm has a third stopper attached thereto that is located between the first stopper and the second stopper. The capacitive sensing circuit determines a first measured capacitance at a first reference position of the moveable mirror when the third stopper is abutting the first stopper and a second measured capacitance at a second reference position of the moveable mirror when the third stopper is abutting the second stopper. The calibration module uses the first measured capacitance at the first reference position and the second measured capacitance at the second reference position to determine the correction amount.

In still another embodiment, the MEMS apparatus includes a fixed structure having a first side and a second side opposite the first side, in which each of the first side and the second side includes a plurality of capacitive sensing points with known spacing therebetween. The MEMS apparatus further includes an actuator arm coupled between the MEMS actuator and the moveable mirror. The actuator arm is moveable between the first side and the second side of the capacitive structure and has a plurality of capacitive fingers with known spacing therebetween. The capacitive sensing circuit is coupled to the fixed structure and the actuator arm to measure a capacitance variation indicative of a change in capacitance between the capacitive sensing points and the capacitive fingers as the moveable mirror moves. The calibration module uses the capacitance variation to determine the correction amount.

In an exemplary embodiment, the capacitive sensing circuit continuously measures a respective capacitance between the capacitive sensing points and the capacitive fingers as the moveable mirror moves to determine zero crossings and peaks of the capacitance variation, in which the zero crossings correspond to maximum offset between the capacitive sensing points and the capacitive fingers and the peaks correspond to minimum offset between the capacitive sensing points and the capacitive fingers. The capacitive sensing circuit further determines respective actual capacitances of the MEMS actuator at each of the zero crossings and the peaks. The calibration module determines reference positions of the moveable mirror at each of the zero crossings and the peaks and determines the correction amount based on the actual capacitances of the MEMS actuator and the reference positions.

In an additional embodiment, the MEMS actuator is an electrostatic actuator having two plates, and the capacitive sensing circuit senses the current capacitance between the two plates. In an exemplary embodiment, the MEMS actuator is an electrostatic comb drive actuator.

In a further embodiment, the capacitive sensing circuit includes a capacitance-to-voltage converter for receiving the current capacitance and producing an output voltage proportional to the capacitance.

Embodiments of the present invention further provide a MEMS interferometer system including an interferometer with a moveable mirror optically coupled to receive and reflect light, a MEMS actuator having a variable capacitance that is coupled to the moveable mirror to cause a displacement thereof, a memory maintaining a table mapping capacitance of the MEMS actuator to position of the moveable mirror, and a capacitive sensing circuit coupled to the MEMS actuator for sensing a current capacitance of the MEMS actuator. The MEMS interferometer system further includes a digital signal processor for accessing the table to determine a current position of the moveable mirror based on the current capacitance of the MEMS actuator and a calibration module for determining respective actual capacitances of the MEMS actuator at two or more known positions of the moveable mirror to determine a correction amount to be applied to the current position of the moveable mirror. The digital signal processor produces a corrected current position of the moveable mirror using the correction amount.

In an exemplary embodiment, the interferometer further includes a beam splitter optically coupled to receive an incident beam and to split the incident beam into a first interfering beam and a second interfering beam and a fixed mirror optically coupled to receive the first interfering beam and to reflect the first interfering beam back towards the beam splitter to produce a first reflected interfering beam. The moveable mirror is optically coupled to receive the second interfering beam and to reflect the second interfering beam back towards the beam splitter to produce a second reflected interfering beam. A detector is optically coupled to detect an interference pattern produced as a result of interference between the first reflected interfering beam and the second reflected interfering beam. In one embodiment, the displacement of the moveable mirror produces an optical path length difference between the first and second interfering beams equal to twice the displacement.

BRIEF DESCRIPTION OF THE DRAWINGS

A more complete understanding of the present invention may be obtained by reference to the following detailed description when taken in conjunction with the accompanying drawings wherein:

FIGS. 11A and 11B are diagrams illustrating a capacitive sensing curve, in accordance with embodiments of the present invention;

FIGS. 12A and 12B are diagrams illustrating drift in the capacitive sensing curve, in accordance with embodiments of the present invention;

DETAILED DESCRIPTION OF THE DRAWINGS

In accordance with embodiments of the present invention, a self-calibration technique is provided to determine the position of a moveable mirror in Micro Electro-Mechanical System (MEMS) applications, such as interferometer/spectrometer applications. This technique enables the integration of the interferometer/spectrometer system on a small chip and reduces the cost and complexity of the system.

Figure 1:
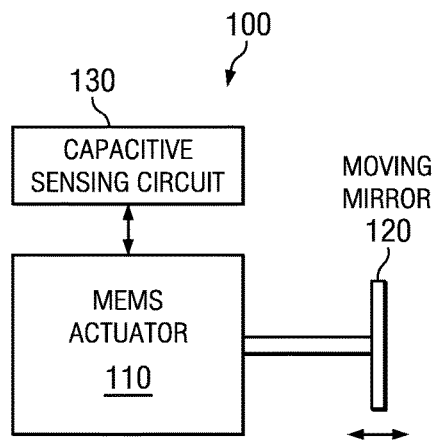
FIG. 1 is a block diagram of an exemplary Micro Electro Mechanical System (MEMS) apparatus for determining the position of a moveable mirror in accordance with embodiments of the present invention.

Referring now to FIG. 1, there is illustrated an exemplary MEMS apparatus 100, in accordance with embodiments of the present invention. The MEMS apparatus 100 includes a MEMS actuator 110 and a moveable mirror 120. The MEMS actuator 110 is an electrostatic actuator, such as a comb drive actuator, parallel plate actuator or other type of electrostatic actuator. The moveable mirror 120 is coupled to the MEMS actuator 110, such that motion of the MEMS actuator causes a displacement in the position of the moveable mirror 120.

Figure 2:
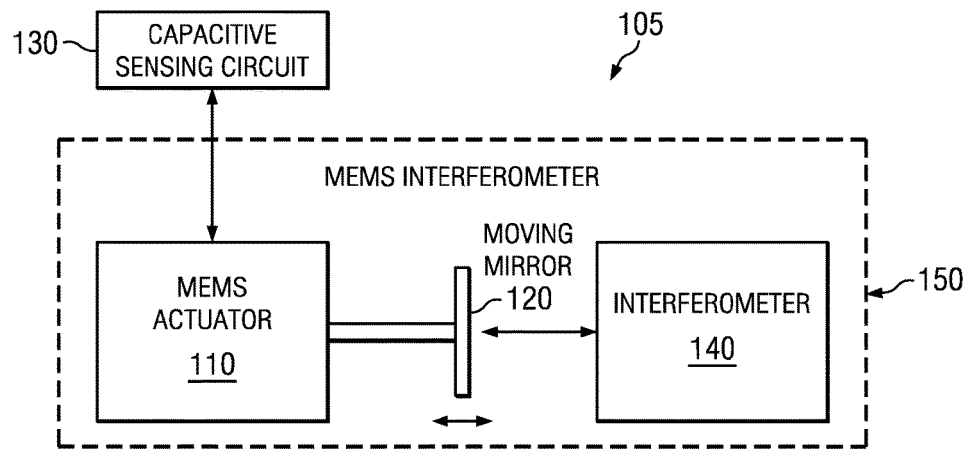
FIG. 2 is a block diagram illustrating exemplary components of a MEMS interferometer system for determining the position of the moveable mirror in accordance with embodiments of the present invention.

In many MEMS applications, it is necessary to have knowledge of the position of the moveable mirror 120. For example, in interferometer applications, the position of the moveable mirror 120 is used to process the output of the interferometer. An example of a MEMS interferometer system 105 is shown in FIG. 2. As can be seen in FIG. 2, the MEMS actuator 110 and moveable mirror 120, together with other components of an interferometer 140, such as a beam splitter, fixed mirror and photodetector (as described in more detail below in connection with FIG. 7) form a MEMS interferometer 150. The MEMS interferometer 150 may be, for example, a Fourier Transform Infrared Spectroscopy (FTIR) spectrometer, a Michelson interferometer, a Mach Zender interferometer or a Fabry-Perot interferometer.

The displacement of the moveable mirror 120 produces an optical path length difference between the two arms of the interferometer 140 in order to achieve the desired interference pattern at the photodetector. To effectively process the signal output from the photodetector, the position of the moveable mirror 120 in at least one plane must be ascertained.

Therefore, referring now to FIGS. 1 and 2, in order to measure the moveable mirror position, the MEMS apparatus 100 also includes a capacitive sensing circuit 130 coupled to the MEMS actuator 110. Since the MEMS actuator 110 is an electrostatic actuator, the MEMS actuator 110 has a variable capacitance that can be measured by the capacitive sensing circuit 130. For example, in one embodiment, the capacitive sensing circuit 130 can be coupled to the two plates of the MEMS actuator 110 to detect the capacitance between the plates (i.e., measure the current value of the capacitance, hereinafter referred to as the "current capacitance," of the MEMS actuator).

Based on the measured current capacitance, the position of the moveable mirror 120 can be determined. As can be appreciated, the separation (distance) between the two plates of the MEMS actuator 110 varies as the mirror 120 moves. Since the MEMS actuator 110 is an electrostatic actuator, the capacitance between the two plates is directly (or in some cases inversely) proportional to the separation between the two plates. As such, the capacitance between the plates can be used to determine this separation, which in turn can be used to determine the mirror position.

Figure 3:
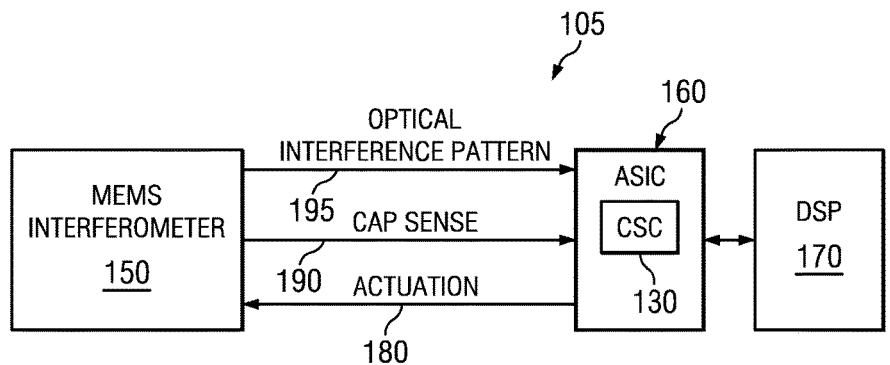
FIG. 3 is a block diagram illustrating further exemplary components of the MEMS interferometer system in accordance with embodiments of the present invention.

FIG. 3 is a block diagram illustrating exemplary components of the MEMS interferometer system 105 in accordance with embodiments of the present invention. In FIG. 3, the capacitive sensing circuit (CSC) 130 is implemented within an application specific integrated circuit (ASIC) 160. The ASIC 160 is further coupled to the MEMS interferometer 150 and to a digital signal processor (DSP) 170. In one embodiment, the DSP 170 is implemented on the ASIC 160. Integrating the DSP 170 on the ASIC 160 yields an attractive, self-contained solution that can be easily integrated in a larger system. However, this imposes restrictions on the ASIC technology selection and may result in interference between the digital part and the sensitive analog front end. Therefore, in other embodiments, the DSP 170 can be implemented on another ASIC or as software executable on a general-purpose personal computer.

The CSC 130 within the ASIC 160 is coupled to receive a capacitive sensing signal 190 from the MEMS actuator of the MEMS interferometer 150. The CSC 130 measures the capacitive sensing signal 190 to determine the current capacitance of the MEMS actuator and transmits the value of the current capacitance to the DSP 170. The DSP 170 processes the current capacitance value to determine the position of the moving mirror within the MEMS interferometer 150.

The ASIC 160 also includes circuitry for generating an actuation signal 180 and transmitting the actuation signal 180 to the MEMS actuator of the MEMS interferometer 150 to control movement of the MEMS actuator. For example, in an exemplary embodiment, the ASIC 160 includes a digital-to-analog converter (DAC) that supports any arbitrary actuation profile. The DAC may also be of very high resolution in order to reduce actuation noise and have a very high spurious-free dynamic range to ensure that unwanted resonance modes are not excited.

In addition, the ASIC 160 is further coupled to receive an optical interference pattern 195 output from the MEMS interferometer 150 and to provide the optical interference pattern 195 to the DSP 170 for processing. For example, in an exemplary embodiment, the MEMS interferometer system 105 is a MEMS FTIR spectrometer system that uses a general purpose MEMS-interface CMOS ASIC 160. In this embodiment, the MEMS interferometer 150 includes a photodetector, a fixed mirror and the moveable mirror. With the motion of the moveable mirror, the photodetector captures the optical interference pattern 195. The ASIC 160 may include a low-noise signal conditioning path that amplifies the signal, removes any dc offsets and provides necessary anti-aliasing filtering. The signal conditioning may be performed in a highly linear manner to reduce any spurious tones in the final output spectrum. At the DSP 170, spectrum analysis of the conditioned pattern with knowledge of the position of the moveable mirror can identify the light wavelength and the spectral print of any material in the light path.

Figure 4:
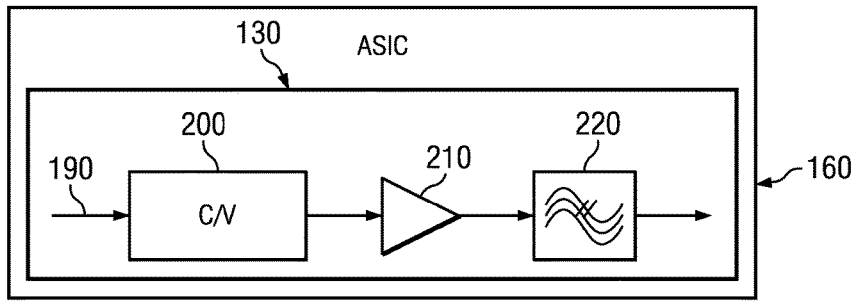
FIG. 4 is a block diagram illustrating exemplary components of an application specific integrated circuit (ASIC) for use within the MEMS interferometer system, in accordance with embodiments of the present invention.

Referring now to FIG. 4, an exemplary CRC 130 is shown. The CRC 130 includes a capacitance-to-voltage converter (C/V) 200, amplifier 210 and low pass filter 220. The C/V 200 is coupled to receive the capacitive sensing signal 190 indicating the current capacitance of the MEMS actuator and operates to convert the current capacitance into a voltage. In particular, the C/V produces a voltage output proportional to the capacitance between the two terminals of the MEMS actuator. The amplifier 210 amplifies the voltage output from the C/V 200 and the low pass filter 220 filters the voltage to remove any spurious signals. In an exemplary embodiment, the C/V 200 is a very low noise C/V that has a wide range of gain and dc offset removal to support wide capacitance ranges superimposed on various fixed capacitances. Low noise levels are desired for the CRC 130, since the mirror position inaccuracy directly impacts the system signal-to-noise ratio (SNR). The ASIC 160 may also exhibit very low voltage and noise levels to allow for resolutions in excess of 18 bits. In further embodiments, the ASIC 160 may also include capacitance calibration circuitry to calibrate the C/V 200.

Figure 5:
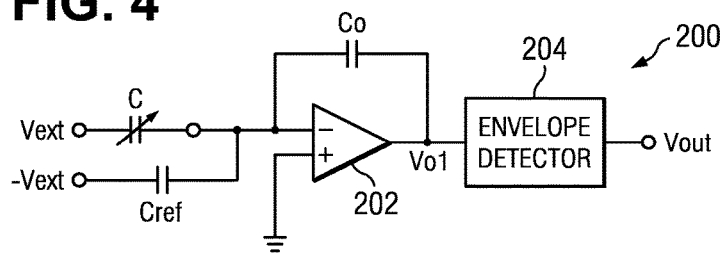
FIG. 5 is a circuit diagram illustrating an exemplary capacitance to voltage circuit for use within the ASIC of FIG. 4, in accordance with embodiments of the present invention.

An example of a C/V 200 is shown in FIG. 5. The C/V 200 includes an input terminal for receiving a capacitance being measured C, an input terminal for receiving a reference capacitance Cref, an operational amplifier 202, a feedback capacitor Co and an Envelope Detector circuit 204. In an exemplary operation, an ac signal of known frequency (for example, 10 kHz) is applied to one terminal of capacitance C, while a negative version of the same excitation signal is applied to the reference capacitor Cref. The output of the operational amplifier 202 is an ac signal of the same frequency whose amplitude is proportional to the value (C-Cref).

The Envelope Detector circuit 204 detects the envelope of the output of the operational amplifier 202. In particular, the Envelope Detector circuit 204 operates to generate an output voltage proportional to the amplitude (envelope) of the ac signal output from the operational amplifier 202. As shown in FIG. 5, the Envelope Detector circuit 204 detects the envelope of signal Vo1 output from the operational amplifier 202 and produces a voltage Vout that is proportional to the value of the capacitance being measured. It should be understood other circuit designs for the C/V 200 are possible, and the present invention is not limited to any particular C/V circuit design. For example, in another embodiment, the C/V 200 may have multiple terminals to sense the difference in two capacitors, where the differential value is proportional to the mirror position.

Figure 6:
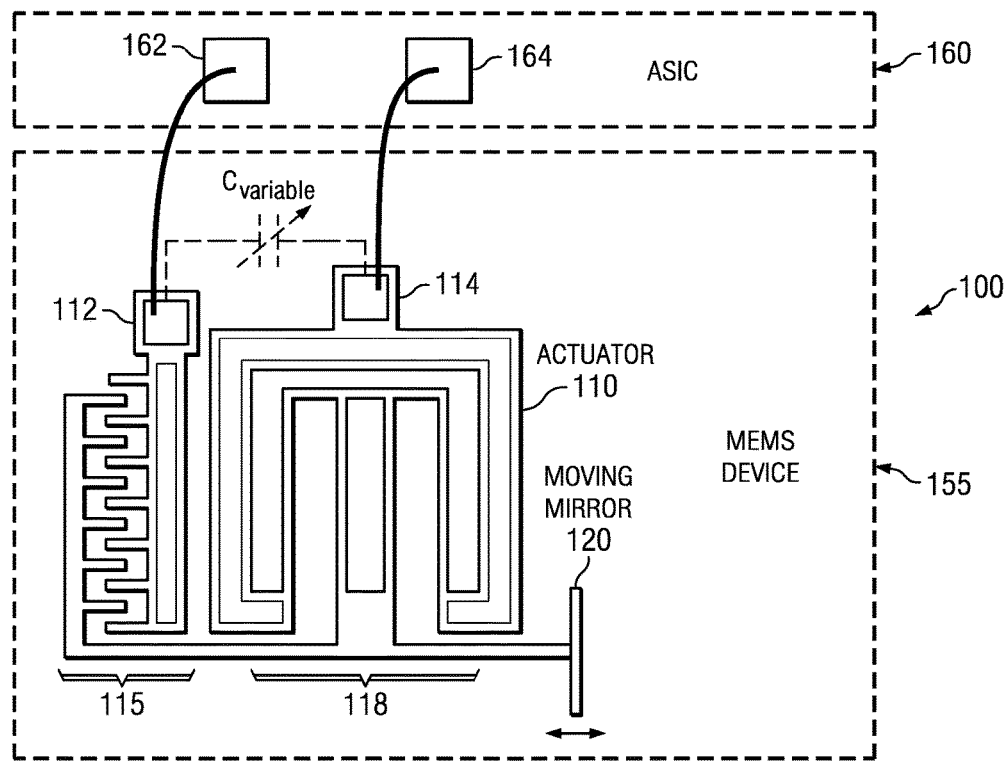
FIG. 6 is a diagram illustrating an exemplary architecture of the MEMS apparatus, in accordance with embodiments of the present invention.

FIG. 6 is a diagram illustrating an exemplary architecture of the MEMS apparatus 100, in accordance with embodiments of the present invention. The MEMS apparatus 100 includes the ASIC 160 and a MEMS device 155, such as a MEMS interferometer. The MEMS device 155 includes an electrostatic comb drive MEMS actuator 110 and a moveable mirror 120. The electrostatic comb drive MEMS actuator 110 shown in FIG. 6 is formed of a comb drive 115 and spring 118, each having a respective terminal 112 and 114. By applying a voltage to the comb drive 115 at terminal 112, a potential difference results across the actuator 110, which induces a capacitance therein, causing a driving force to be generated as well as a restoring force from the spring 118, thereby causing a displacement of moveable mirror 120 to the desired position. The induced capacitance Cvariable can be measured across terminals 112 and 114 by connecting terminals 112 and 114 to ports 162 and 164 on the ASIC 160.

In one embodiment, the actuation signal from ASIC 160 is transmitted over the same port (port 162) as the capacitance sensing signal using time or frequency division multiplexing. By having both functions (actuation and capacitive sensing) on a single port, the maximum actuation voltage necessary may be reduced, while also increasing the sensed capacitance. However, this may lead to undesired interaction between the sense and actuation circuitry. Therefore, in other embodiments, the actuation signal is sent over a different port (not shown) on the ASIC 160. It should be understood that the layout and features of the MEMS actuator 110 shown in FIG. 6 are merely exemplary, and that the invention can be realized with any electrostatic MEMS actuator design, whether a comb drive actuator, parallel plate actuator or other type of electrostatic MEMS actuator.

Figure 7:
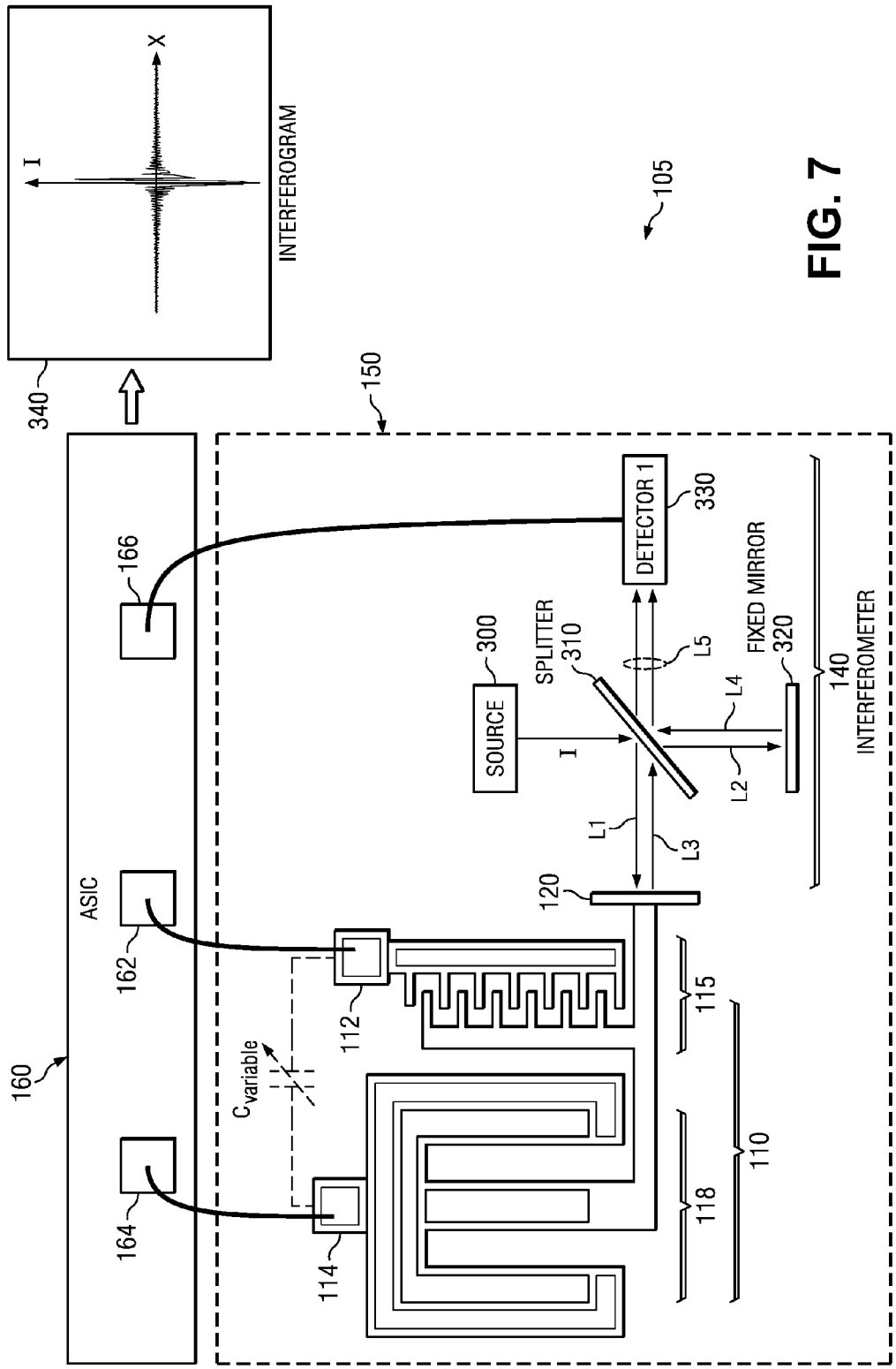
FIG. 7 is a diagram illustrating an exemplary architecture of the MEMS interferometer system, in accordance with embodiments of the present invention.

FIG. 7 is a diagram illustrating an exemplary architecture of the MEMS interferometer system 105, in accordance with embodiments of the present invention. The MEMS interferometer system 105 includes the MEMS interferometer 150 and ASIC 160. The MEMS interferometer 150 may be, for example, a Fourier Transform Infrared (FTIR) spectrometer that is realized over an SOI wafer to allow for a MEMS-actuated moving mirror.

The MEMS interferometer 150 includes the MEMS actuator 110 and interferometer 140. As shown in FIG. 7, the interferometer 140 includes a light source 300, beam splitter 310, fixed mirror 320, photodetector 330 and moveable mirror 120. The light source 300 produces an incident beam I that travels through the interferometer 140 until it reaches the half plane beam splitter 310. In an exemplary embodiment, the beam splitter 310 is formed at an interface between a first medium (i.e., silicon (Si)) and a second medium (i.e., air). The silicon/air interface beam splitter 310 is positioned at an angle (for example, 45 degrees) from the incident beam I. The desired angle may be produced, for example, by photolithographically defining a surface of the silicon medium.

Upon impinging the half plane beam splitter 310, the incident beam I is split into two interfering beams L1 and L2. L1 originates from the partial reflection of the incident beam I from the silicon/air half plane beam splitter 310, and thus has a reflection angle equal to the beam incidence angle. L2 originates from the partial transmission of the incident beam I through silicon/air half plane beam splitter 310 and propagates at least partially in silicon at a refraction angle (determined by Snell's law). As a result, L1 propagates towards the moveable mirror 120, while L2 propagates towards fixed mirror 320.

Beam L1 is reflected by moveable mirror 120, thus producing reflected beam L3, while beam L2 is reflected by fixed mirror 320, thus producing reflected beam L4. As shown in FIG. 7, both beams L3 and L4 take the same optical path of L1 and L2 respectively (in the opposite direction) after reflection from mirrors 120 and 320 respectively, back towards the half plane beam splitter 310. Thus, in embodiments in which the spectrometer/interferometer is used as a Fourier Transform (FT) spectrometer, one interferometer arm is formed by beams L1/L3 and includes the beam splitter 310 and moveable mirror 120, while another interferometer arm is formed by beams L2/L4 and includes fixed mirror 320.

An interference pattern L5 is produced from reflected beams L3 and L4 interfering at the beam splitter 310. The interference pattern L5 is detected by detector 330. The output of the detector 330 is input to the ASIC 160 via terminal 166. In one embodiment, the detector 330 includes a photodetector that is assembled through micromachining in the substrate (e.g., by etching the top surface of the substrate to realize an opening within which the photodetector may be placed) or that is realized monolithically within the substrate either through doping (e.g., to realize a P-I-N diode) or partial metallization (e.g., to realize metal-semiconductor-metal MSM photodetector).

As also shown in FIG. 7, moveable mirror 120 is movable using a SOI electrostatic MEMS actuator 110. As in FIG. 6, the electrostatic MEMS actuator 110 is shown formed of a comb drive 115 and spring 118. A voltage can be applied to the comb drive 114 via terminal 114, thereby inducing a capacitance across terminals 112 and 114 and causing a displacement of the moveable mirror 120 to the desired position for reflection of the beam L1. As such, an optical path length difference (OPD) between beams L3 and L4 can be achieved that is substantially equal to twice the mirror displacement.

In addition, the capacitance across terminals 112 and 114 can be measured by the ASIC 160 via ports 162 and 164 to determine the position of the moveable mirror 120. Based on the determined moveable mirror position and the output of the detector 330, an interferogram 340 can be produced (e.g., by the DSP 170 shown in FIG. 3) to identify the light wavelength and the spectral print of any material in the light path.

The moveable mirror 120 in FIG. 7 is shown positioned at the zero path difference between the two optical paths (L1/L3 and L2/L4). However, in other embodiments, to remove phase noise and errors produced as a result of the capacitive sensing technique, the moveable mirror 120 can be positioned at a distance δ behind the zero path position, and the moveable mirror 120 can be moved through the zero path position such that measurements are taken on both the positive and negative sides of the zero path position. In this embodiment, the source 300 is a wide band source (i.e., white light source) and the negative and positive sides may be equal or not equal. At the DSP 170 (shown in FIG. 3), the complex Fourier transform of the interferogram 340 can be taken to compensate for any phase errors in the mirror position. In another embodiment, instead of recording both the positive and negative sides of the interferogram, only a small part of the interferogram on the negative (left) side may be taken and used by the DSP to extract the correct signal and remove some of the phase noise and errors produced by the capacitive sensing technique.

In one embodiment, mirrors 120 and 320 are metallic mirrors, where selective metallization (e.g. using a shadow mask during metallization step) is used to protect the beam splitter. In another embodiment, non-metallic vertical Bragg mirrors are used to obtain a small foot print spectrometer. The Bragg mirrors can be realized using Deep Reactive Ion Itching (DRIE), thus producing successive vertical silicon/air interfaces. In addition, the Bragg mirrors can be designed either to have a wide spectrum reflection response to act as simple reflectors or with a wavelength selective response, depending on the application.

Although a silicon/air interface is described herein for the beam splitter 310, other mediums providing a half wave plane beam splitter can be used to realize the invention. For example, in another exemplary embodiment, micromachined or assembled glass half-planes or other materials, such as Pyrex, can be used instead of silicon to allow for a wider spectral window of operation. In addition, other materials, such as liquids or different gases, can be used instead of air to provide a degree of freedom to modify the reflection coefficient of the half plane beam splitting interface.

Figure 8:
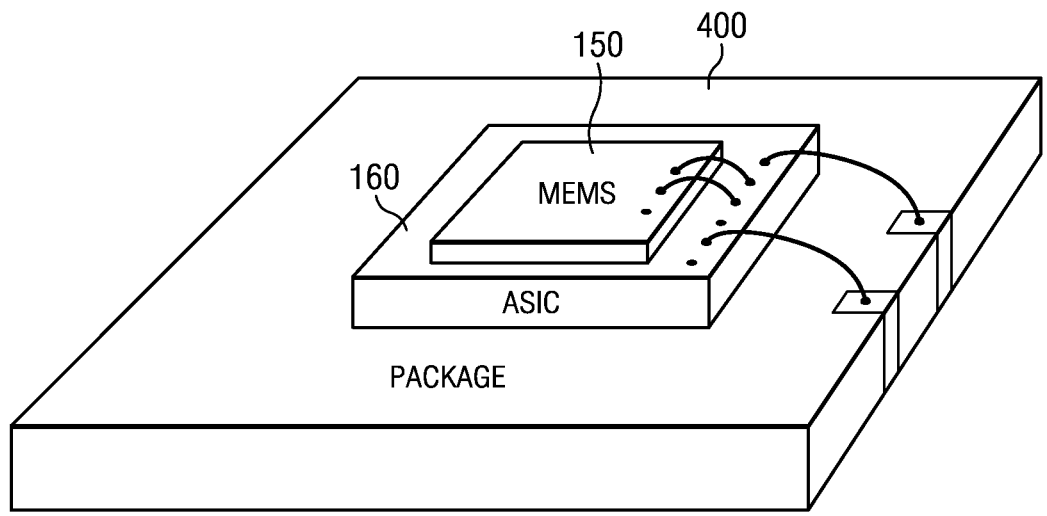
FIG. 8 is a diagram illustrating an exemplary MEMS die package, in accordance with the present invention.

FIG. 8 is a diagram illustrating an exemplary MEMS die package 400, in accordance with the present invention. By using capacitive sensing to determine the position of the moveable mirror, the MEMS interferometer 150 can be integrated with the ASIC 160 chip together on the same MEMS die package 400, thereby reducing the size, cost and complexity of the MEMS system.

Figure 9:
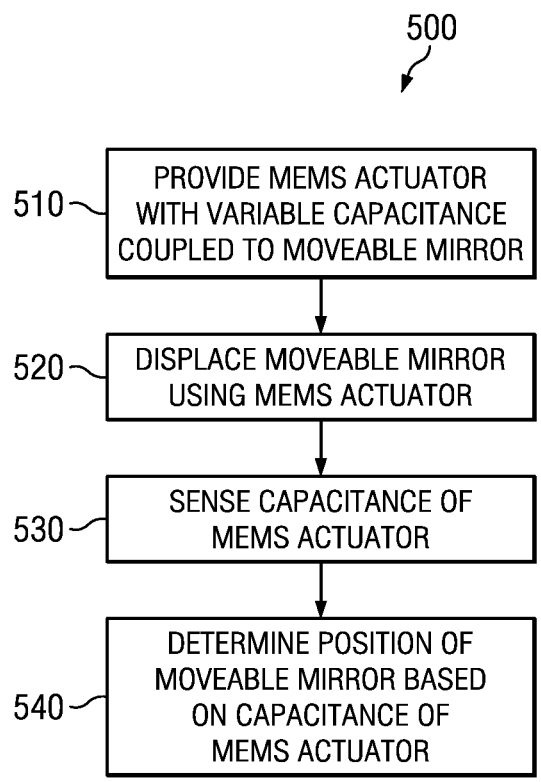
FIG. 9 illustrates an exemplary method for determining the position of a moveable mirror within a MEMS apparatus, in accordance with embodiments of the present invention.

FIG. 9 illustrates an exemplary method 500 for determining the position of a moveable mirror within a MEMS apparatus, in accordance with embodiments of the present invention. The method begins at 510, where an electrostatic MEMS actuator having a variable capacitance is provided coupled to the moveable mirror. At 520, the moveable mirror is displaced using the MEMS actuator. Thereafter, at 530, a current capacitance of the MEMS actuator is sensed, and at 540, the position of the moveable mirror is determined based on the current capacitance of the MEMS actuator.

Figure 10:
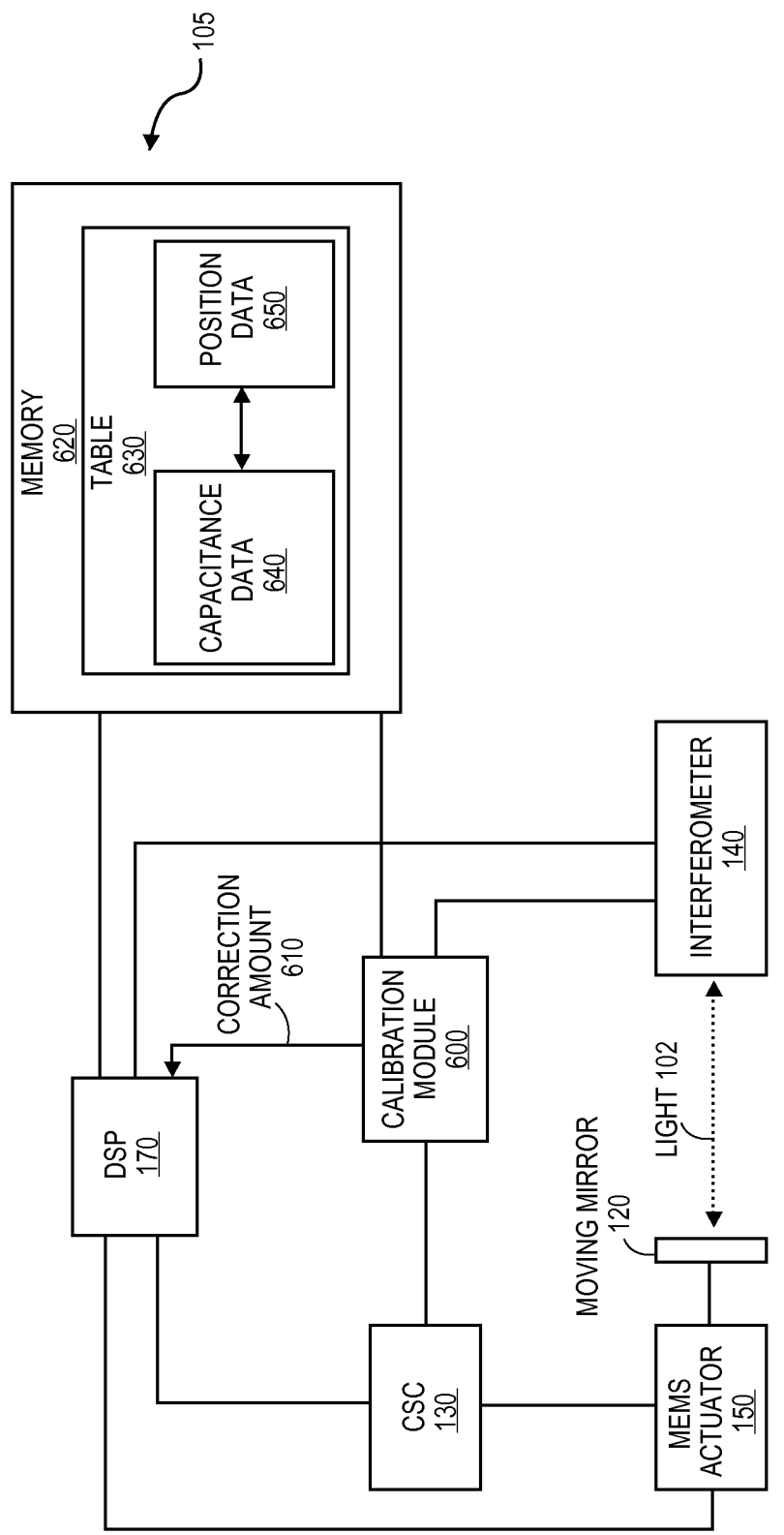
FIG. 10 is a block diagram illustrating an exemplary MEMS interferometer system for performing self-calibration of mirror positioning, in accordance with embodiments of the present invention.

Referring now to FIG. 10, in some embodiments, the capacitive sensing circuit may suffer from performance drifts due to stress, temperature, humidity, normal drift of electronic components, as well as other reasons. Such drift in the capacitive sensing circuit affects the accuracy of the position of the moveable mirror, which directly affects the spectrometer/interferometer operation. Therefore, as shown in FIG. 10, a calibration module 600 can be included in the MEMS interferometer 105 to calibrate the capacitive sensing circuit (CSC) 130 used for the determination of optical path difference modulation. In one embodiment, the calibration module 600 is an algorithm executable by the DSP 170 and may be stored, for example, in memory 620. In another embodiment, the calibration module 600 is included within the ASIC of the CSC 130, or within an additional ASIC.

As discussed above, the movable mirror 120 introduces an optical path difference in one path of the interferometer 140 leading to an output interferogram from which spectrum can be extracted by Fourier transform as indicated in Equations 1 and 2 below.

$$I(x) = \int_{-\infty}^{\infty} B(v) \cos(2\pi v x) dv \quad \text{(Equation 1)}$$

$$B(v) = \int_{-\infty}^{\infty} I(x) \cos(2\pi v x) dx \quad \text{(Equation 2)}$$

In order to obtain accurate spectra, a precise determination of the optical path difference (OPD) due to the movable mirror displacement is needed. The accuracy of the OPD is initially calibrated using the CSC 130, as discussed above, to capacitively sense motion of the MEMS actuator 150 as the moving mirror 120 is moved through the full range of motion. The resulting measured capacitances (capacitance data 640) are mapped to the corresponding OPD (position data 650), and then can be stored within a table 630 in a memory 620.

For example, a light beam 102 of a certain known wavelength $\lambda_o$ can be injected into the MEMS interferometer 105 to calibrate the CSC 130 on the production line once for each spectrometer sample. As can be seen in FIGS. 11A and 11B, the capacitance to OPD relation is determined using the fact that two consecutive peaks of the resulting interferogram represents an OPD of $\lambda_o$ and mapping this to the measured capacitance variation to produce a capacitive sensing curve 720, as follows:

$$I(x) = I_o(v_o)\cos\left(2\pi\frac{x}{\lambda_o}\right) \quad \text{(Equation 3)}$$

where the distance ($\Delta x$) between two consecutive zero crossings 710 is equal to $\lambda_o/2$.

Referring again to FIG. 10, the capacitive sensing curve 720 of FIG. 11B can be used to populate the look-up table 620 of C (capacitance data 640) to x (position data 650) relation, which can then be used to determine the position of the moveable mirror 120 during subsequent operations of the MEMS interferometer 105. For example, during a subsequent operation of MEMS interferometer 105, the capacitance across the MEMS actuator 150 can be measured by the CSC 130, and the measured capacitance can be provided to the DSP 170 to determine the position of the moveable mirror 120 by accessing the table 630 in memory 620.

In addition, as shown in FIG. 10, to compensate for any drift in the CSC 130, the calibration module 600 can further determine a correction amount 610 and provide this correction amount 610 to the DSP 170. The DSP 170 can use the correction amount 610 and the previously determined mirror position (based on the measured capacitance provided by the CSC 130 and the table 630 look-up) to determine a corrected mirror position. Based on the corrected moveable mirror position and the output of the interferometer 140, the DSP 170 can then produce an interferogram to identify the light wavelength and the spectral print of any material in the light path. Furthermore, the DSP 170 and/or ASIC containing the CSC 130 can generate an actuation signal to control movement of the MEMS actuator 150 to move the mirror 120 to a desired position using the correction amount 610.

In an exemplary embodiment, the calibration module 600 determines the correction amount 610 by determining the actual capacitance of the MEMS actuator 150 at two or more known positions of the moveable mirror 120. For example, the calibration module 600 can compare the actual measured capacitances of the MEMS actuator 150 to corresponding respective capacitances within the table 630 at the two or more known positions to calculate respective errors between the measured actual capacitances and the corresponding capacitances within the table 630. The calibration module 600 can then extrapolate a corrected capacitance sensing curve using the initial capacitance sensing curve and the calculated errors and determine the correction amount 610 to be applied to the mirror position based on the difference between the corrected capacitance sensing curve and the initial capacitance sensing curve.

Figure 13:
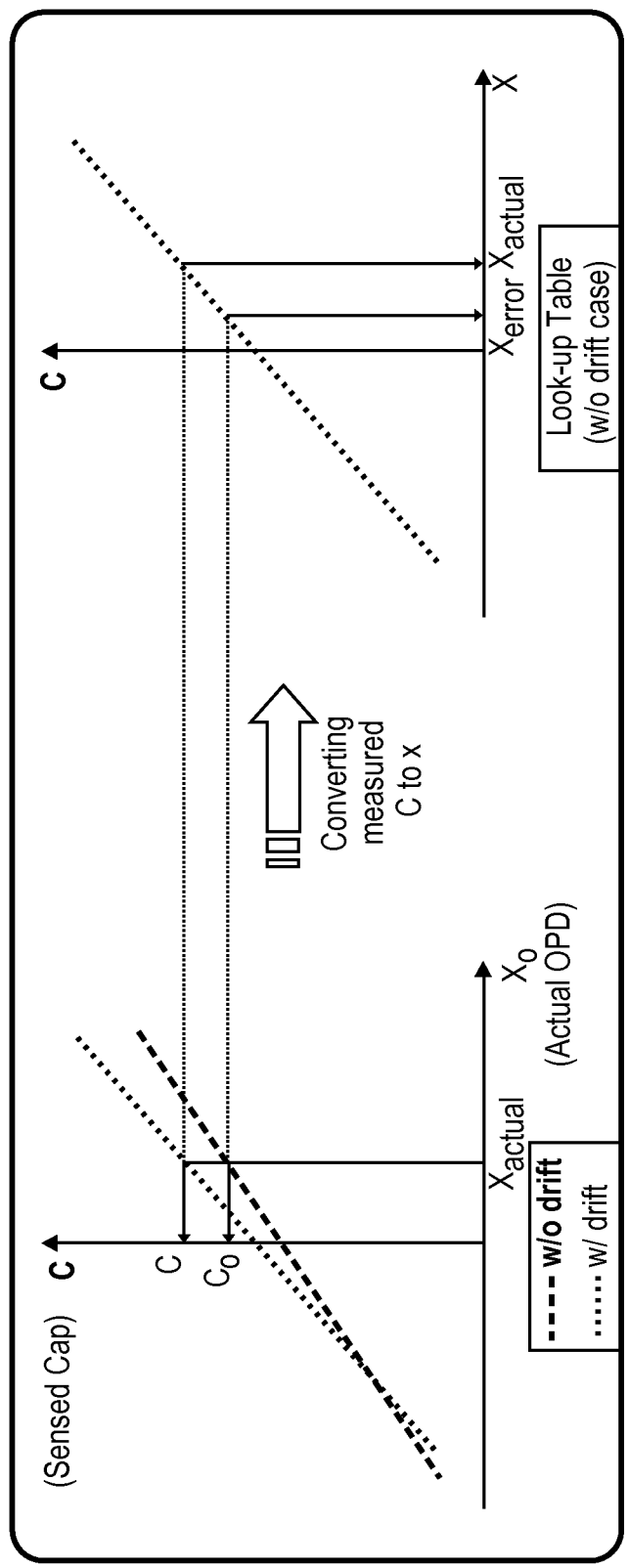
FIG. 13 is a diagram illustrating errors in the mirror position as a result of drift in the capacitive sensing curve, in accordance with embodiments of the present invention.

For example, as shown in FIGS. 12A and 12B, drifts in the initial capacitance values (stored in table 630 of FIG. 10) may occur in the form of offset error ($B_d$) and/or gain error ($A_d$). As can be seen in FIGS. 12A and 12B, the initial values stored in the table provide a capacitance value of $B_o$ at zero OPD with a gain of $A_o$. During a subsequent operation of the MEMS interferometer, drift in the CSC has occurred, such that the zero OPD corresponds to a capacitance value of $B_d$ and the gain is now $A_d$. As further shown in FIG. 13, when such drift is present, using the initial values mapping the capacitive sensing to OPD relation results in erroneous OPD values ($x_{error}$ as compared to $x_{actual}$), which can lead to wavelength errors and spectral shift. Therefore, an additional calibration of the initial capacitance values is needed to correct the OPD values. The additional calibration produces a correction amount, as described above, which may include an offset error amount and/or gain error amount.

Figure 14:
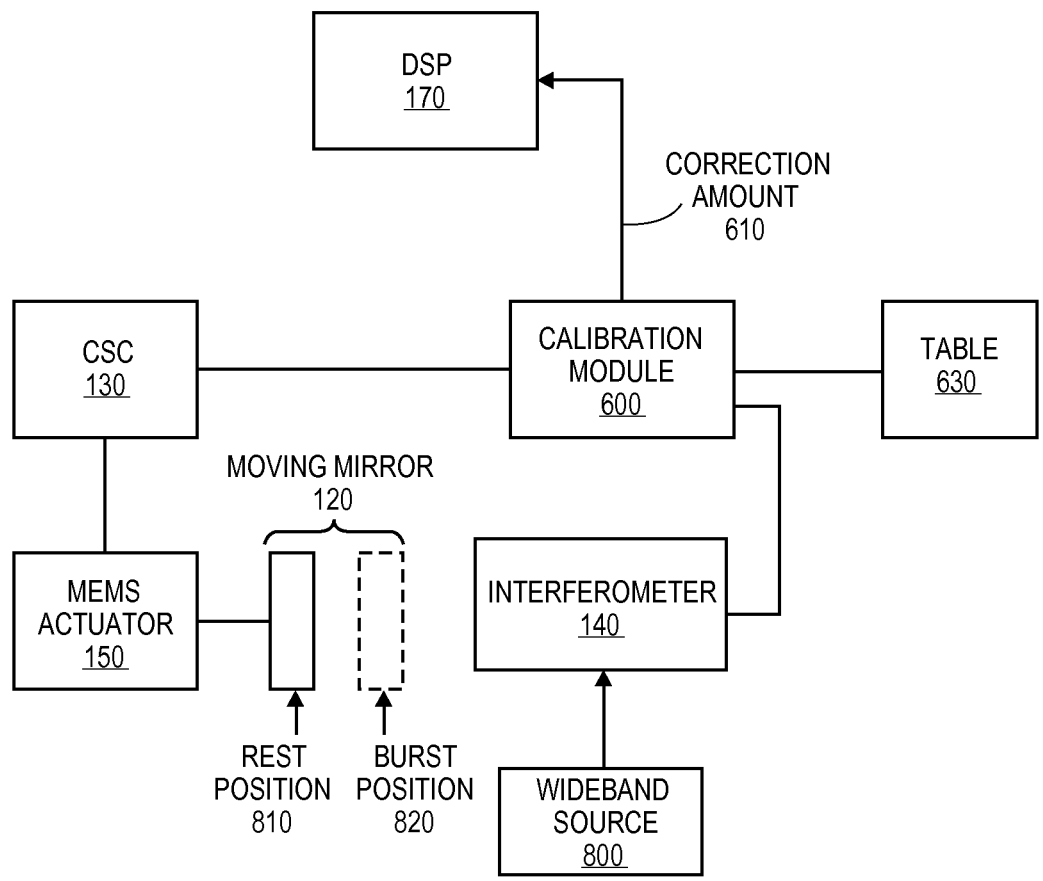
FIG. 14 is a block diagram illustrating exemplary components of a MEMS interferometer system for performing a linear correction technique to calibrate the mirror position, in accordance with embodiments of the present invention.
Figure 15:
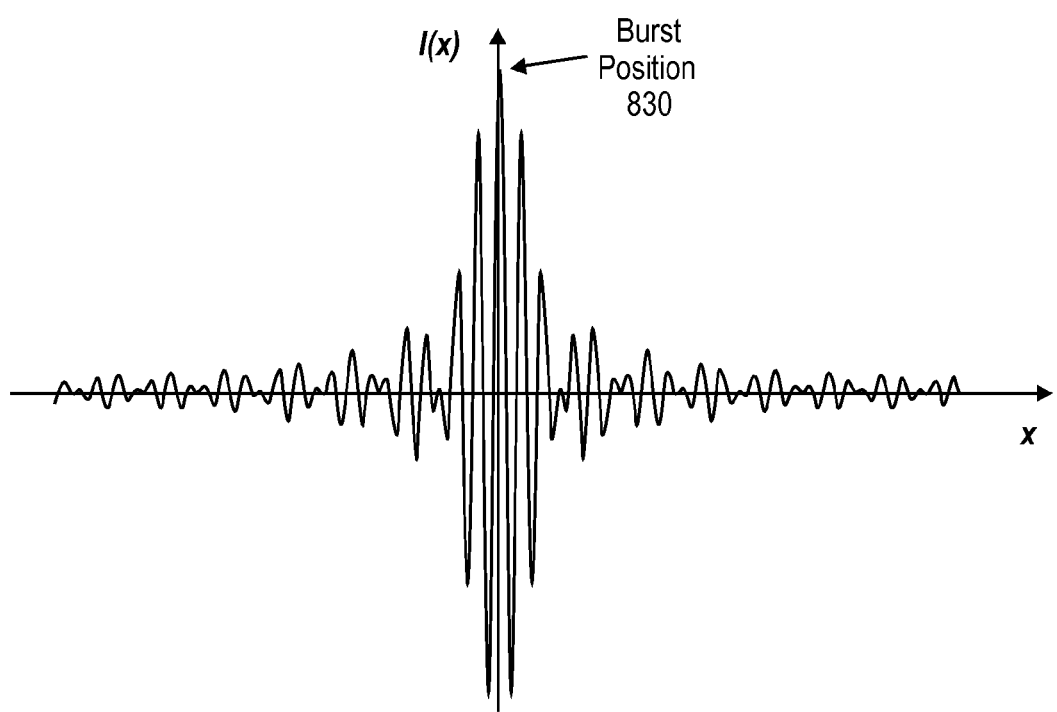
FIG. 15 is a diagram illustrating an interferogram of a white light source, in accordance with embodiments of the present invention.

FIGS. 14-18 illustrate exemplary correction techniques to account for the capacitive sensing drift, thus enabling self-sustained calibration for optical path modulation of the MEMS interferometer. In one embodiment, as shown in FIGS. 14 and 15, a wideband light source 800 is used to self-calibrate the MEMS interferometer. In this embodiment, it is assumed that the error in the capacitance measurements versus the position is linear. Therefore, only two capacitance measurements at known mirror positions are needed to correct for drift errors in the C to x relation.

The wide band light source 800 has a spectrum S(v) that is injected into the interferometer 140. The resulting white light interferogram, shown in FIG. 15, can be expressed as the following for a MEMS interferometer working within a wave number range from $v_1$ to $v_2$:

$$I(x) = \frac{1}{2}\int_{v_1}^{v_2} S(v)\cos(2\pi vx)\,dv = \quad \text{(Equation 4)}$$

$$\frac{1}{4}\left[W_v\cos(2\pi v_0 x)\sin\frac{(\pi W_v x)}{\pi W_v x}\right] * s(x),$$

where $$v_0 = \frac{v_1 + v_2}{2} \quad \text{(Equation 5)}$$

$$W_v = v_1 - v_2 \quad \text{(Equation 6)}$$

$$s(x) = \text{Fourier Transform}[S(v)] \quad \text{(Equation 7)}$$

As can be seen in FIG. 15, the mirror position at the center burst 830 of the white light interferogram is irrespective of the source spectrum shape, which makes relying on that position more immune to source fluctuations and drift. Therefore, as shown in FIG. 14, the CSC 130 can continuously measure the capacitance of the MEMS actuator 150 while the white light interferogram is being obtained and provide the measured capacitance values to the calibration module 600. From the resulting interferogram provided by the interferometer 140, the calibration module 600 can determine the measured capacitance when the moving mirror 120 was at a burst position 820 corresponding to the center burst 830 and map that burst position 820 to zero OPD, which can be considered a first reference position for self-calibration.

In addition, the CSC 130 can measure the capacitance of the MEMS actuator 150 when the MEMS actuator is idle (i.e., no actuation is being applied to the moving mirror 120) and provide the idle measured capacitance to the calibration module 600. As is evident, when the MEMS actuator 150 is idle, the moving mirror 120 is at a known rest position 810, which can be considered a second reference position for self-calibration. Using the measured capacitance at each of the reference positions and the initial capacitance and position values stored in the table 630, the calibration module 600 can determine the correction amount 610 to be applied by the DSP 170 to the capacitance sensing curve (values stored in table 630) during subsequent MEMS interferometer operations. Therefore, any capacitive sensing linear drifts in subsequent interferograms can be compensated for using the correction amount 610.

Figure 16:
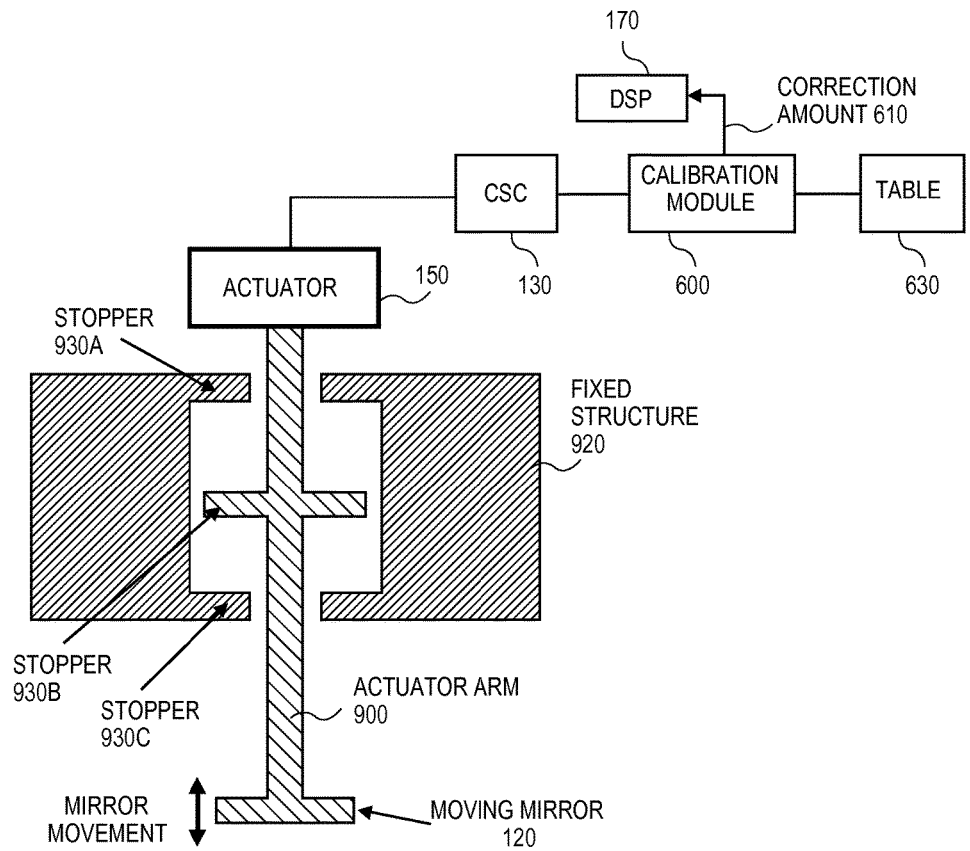
FIG. 16 is a block diagram illustrating exemplary components of a MEMS interferometer system for performing another linear correction technique to calibrate the mirror position, in accordance with embodiments of the present invention.

FIG. 16 illustrates another linear correction technique using actuator stoppers 930a-930c to self-calibrate the MEMS interferometer. In the embodiment shown in FIG. 16, the MEMS actuator 150 is coupled to the moving mirror 120 via an actuator arm 900. A fixed structure 920 surrounds the actuator arm 900, such that the actuator arm 900 lies between opposing sides of the fixed structure 920. The fixed structure 920 has a first stopper 930a at a first end thereof and a second stopper 930c at a second end thereof. The actuator arm 900 has a third stopper 930b attached thereto that is positioned between the first stopper 930a and the second stopper 930c of the fixed structure 920.

The MEMS actuator 150 is configured to move the mirror 120 over a range extending between the first stopper 930a and the second stopper 930c of the fixed structure 920. In addition, the respective positions (displacements) of the moveable mirror 120 when the third stopper 930b on the actuator arm 920 is abutting the first stopper 930a and the second stopper 930c are known. Therefore, the CSC 130 can measure the capacitance of the MEMS actuator 150 when the third stopper 930b of the actuator arm 900 is abutting the first stopper 930a of the fixed structure 920, which can correspond to a first reference position of the moveable mirror 120 for self-calibration. Likewise, the CSC 130 can measure the capacitance of the MEMS actuator 150 when the third stopper 930b of the actuator arm 900 is abutting the second stopper 930c of the fixed structure 920, which can correspond to a second reference position of the moveable mirror 120 for self-calibration. From the measured capacitances at both reference positions and the initial stored capacitances within the table 630, the calibration module 600 can determine the correction amount 610 to be applied by the DSP 170 to the capacitance sensing curve (values stored in table 630) during subsequent MEMS interferometer operations.

In another embodiment, combining the linear techniques illustrated in FIGS. 14 and 16 can provide for non-linear correction in MEMS interferometers where non-linear errors are present. Each of the techniques in FIGS. 14 and 16 uses two measurement points to determine the error. Thus, combining the two techniques provides four measurement points that can be used to correct for fourth degree errors.

Figure 17:
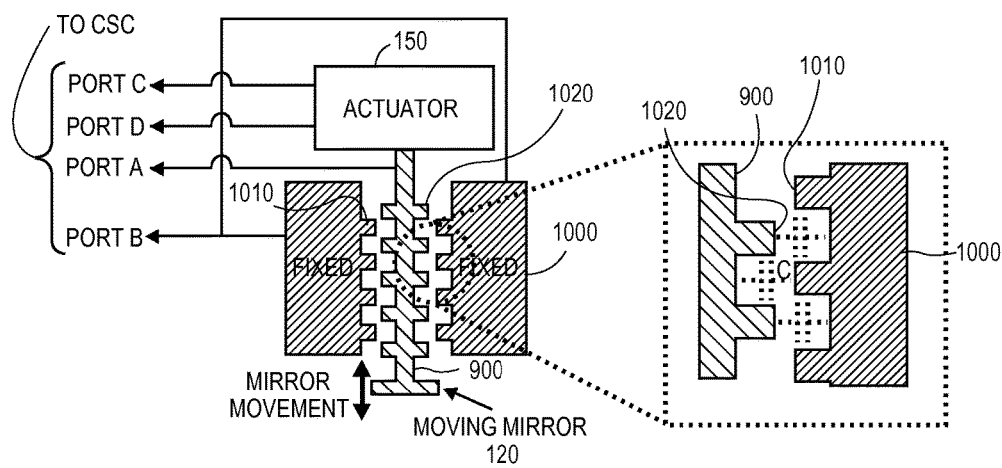
FIG. 17 is a block diagram illustrating exemplary components of a MEMS interferometer system for performing a non-linear correction technique to calibrate the mirror position, in accordance with embodiments of the present invention.

Even higher order errors (fourth degree or higher) can be corrected using the capacitive sensing technique illustrated in FIG. 17. In FIG. 17, a fixed capacitive structure 1000 is provided on either side of the actuator arm 900, such that the actuator arm 900 is positioned between opposing sides of the fixed structure 1000. Each side of the fixed structure includes a plurality of capacitive sensing points 1010 with known spacing therebetween. In addition, the actuator arm 900 includes a plurality of capacitive fingers 1020 with known spacing therebetween.

The actuator arm 900 is coupled to a first port (Port A) of the CSC, while the fixed structure 1000 is coupled to a second port (Port B) of the CSC to enable the CSC to measure a capacitance variation indicative of a change in capacitance between the capacitive sensing points 1010 and the capacitive fingers 1020 as the MEMS actuator 150 moves the moveable mirror 120. The capacitance variation can then be used by the calibration module to determine the correction amount.

For example, the CSC can continuously measure a respective capacitance between the capacitive sensing points 1010 and the capacitive fingers 1020 as the moveable mirror 120 moves to determine zero crossings and peaks of the capacitance variation. As should be understood, the zero crossings correspond to maximum offset between the capacitive sensing points 1010 and the capacitive fingers 1020 and the peaks correspond to minimum offset between the capacitive sensing points 1010 and the capacitive fingers 1020.

In addition, as described above in connection with FIGS. 6 and 7, respective actual capacitances across the MEMS actuator 150 at each of the zero crossings and the peaks can be measured at Ports C and D of the CSC. The calibration module can then determine reference positions of the moveable mirror 120 at each of the zero crossings and the peaks and determine the correction amount based on the actual capacitances of the MEMS actuator and the reference positions.

Figure 18:
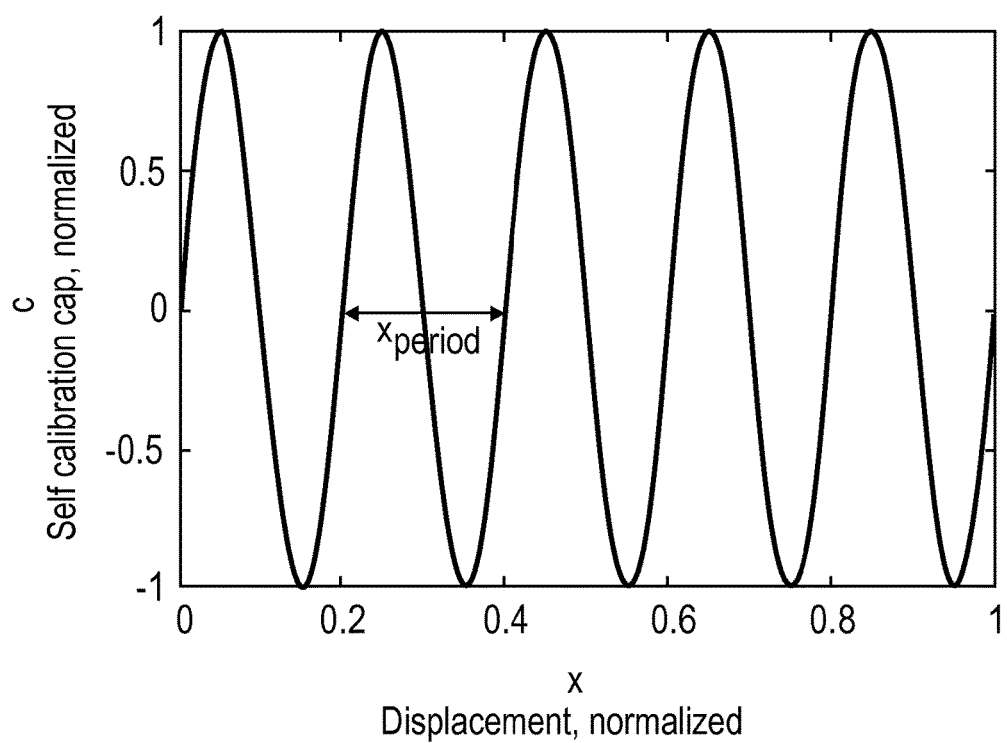
FIG. 18 is a diagram illustrating the capacitive sensing non-linear correction technique of FIG. 17, in accordance with embodiments of the present invention.

Thus, the capacitive sensing calibration technique of FIG. 17 enables N reference points to be obtained, where the spacing between capacitance zero crossings or capacitance peaks corresponds to a reference fixed period $x_{period}$, as can be seen in FIG. 18. By sensing the capacitance change between the moving mirror arm 900 and the fixed structure 1000, mirror displacement and consequently OPD can be calibrated using the capacitance zero crossings and the capacitance peaks shown in FIG. 18.

Figure 19:
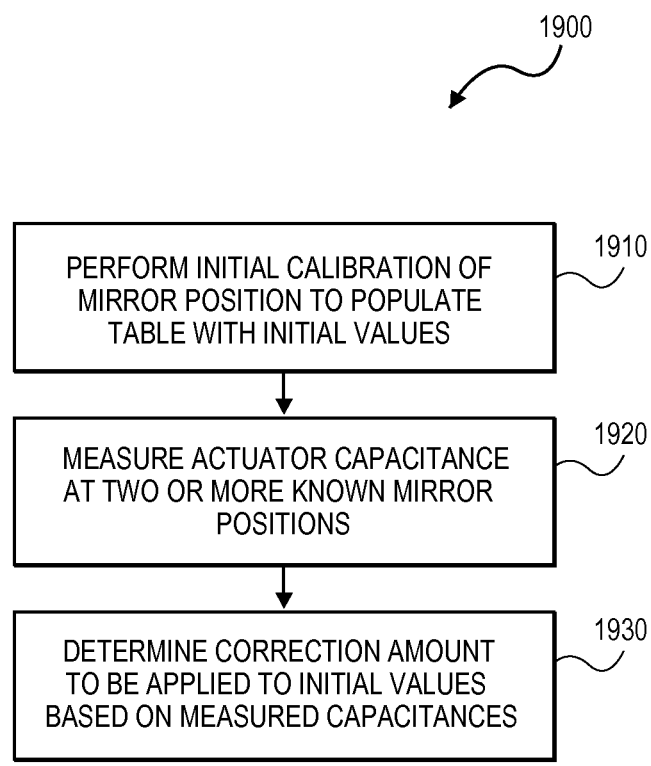
FIG. 19 illustrates an exemplary method for self-calibration for mirror positioning within an optical MEMS interferometer, in accordance with embodiments of the present invention.

FIG. 19 illustrates an exemplary method 1900 for self-calibration for mirror positioning within an optical MEMS interferometer, in accordance with embodiments of the present invention. The method begins at 1910, where an initial calibration of the mirror position is performed to populate a table of initial values of the MEMS actuator capacitance and corresponding mirror position. At 1920, the MEMS actuator capacitance is again measured at two or more known positions of the mirror. Then, at 1930, a correction amount to be applied to the initial values stored in the table is determined based on the measured capacitances at the known positions.

As will be recognized by those skilled in the art, the innovative concepts described in the present application can be modified and varied over a wide range of applications. Accordingly, the scope of patents subject matter should not be limited to any of the specific exemplary teachings discussed, but is instead defined by the following claims.

We claim:

1. A Micro-Electro-Mechanical System (MEMS) apparatus, comprising:
   a moveble mirror;
   a MEMS actuator coupled to the moveable mirror to cause a displacement thereof, the MEMS actuator having a variable capacitance;
   a memory maintaining a table mapping capacitance of the MEMS actuator to position of the moveable mirror;
   a capacitive sensing circuit coupled to the MEMS actuator for sensing a current capacitance of the MEMS actuator;
   a digital signal processor for accessing the table to determine a current position of the moveable mirror based on the current capacitance of the MEMS actuator; and
   a calibration module for determining respective actual capacitances of the MEMS actuator at two or more known positions of the moveable mirror to determine a correction amount to be applied to the current position of the moveable mirror;

wherein the two or more known positions of the moveable mirror correspond to positions at which the moveable mirror is not in contact with another object;

wherein the digital signal processor further produces a corrected current position of the moveable mirror using the correction amount.

2. The MEMS apparatus of claim 1, further comprising:
a light source for producing an input beam having a known wavelength;
an interferometer including the moveable mirror and further including:
  a beam splitter optically coupled to receive the input beam and to split the input beam into a first interfering beam and a second interfering beam;
  a fixed mirror optically coupled to receive the first interfering beam and to reflect the first interfering beam back towards the beam splitter to produce a first reflected interfering beam;
  the moveable mirror optically coupled to receive the second interfering beam and to reflect the second interfering beam back towards the beam splitter to produce a second reflected interfering beam, the displacement of the moveable mirror producing an optical path length difference between the first and second interfering beams equal to twice the displacement; and
  a detector optically coupled to detect an interference pattern produced as a result of interference between the first reflected interfering beam and the second reflected interfering beam;
the capacitive sensing circuit measures a capacitance variation as the moveable mirror moves through at least two zero crossings of the interference pattern; and
the digital signal processor populates the table based on the capacitance variation and the interference pattern.

3. The MEMS apparatus of claim 1, wherein:
the table represents a capacitance sensing curve;
the calibration module compares the actual capacitances of the MEMS actuator to corresponding respective capacitances within the table at the two or more known positions to calculate respective errors between the measured actual capacitances and the corresponding capacitances within the table;
the calibration module extrapolates a corrected capacitance sensing curve using the capacitance sensing curve and the calculated errors; and
the calibration module uses the corrected capacitance sensing curve to determine the correction amount to be applied to the current position.

4. The MEMS apparatus of claim 1, further comprising:
a wide band light source for producing a wide band light beam;
an interferometer including the moveable mirror and further including:
  a beam splitter optically coupled to receive the wide band light beam and to split the wide band light beam into a first interfering beam and a second interfering beam;
  a fixed mirror optically coupled to receive the first interfering beam and to reflect the first interfering beam back towards the beam splitter to produce a first reflected interfering beam;
  the moveable mirror optically coupled to receive the second interfering beam and to reflect the second interfering beam back towards the beam splitter to produce a second reflected interfering beam, the displacement of the moveable mirror producing an optical path length difference between the first and second interfering beams equal to twice the displacement; and
  a detector optically coupled to detect an interference pattern produced as a result of interference between the first reflected interfering beam and the second reflected interfering beam;
the capacitive sensing circuit determines a first measured capacitance at a first reference position of the moveable mirror corresponding to a center burst of the interference pattern;
the capacitive sensing circuit determines a second measured capacitance at a second reference position of the moveable mirror corresponding to zero actuation applied to the moveable mirror by the MEMS actuator; and
the calibration module uses the first measured capacitance at the first reference position and the second measured capacitance at the second reference position to determine the correction amount.

5. The MEMS apparatus of claim 1, further comprising:
a fixed structure having a first stopper at a first end thereof and a second stopper at a second end thereof;
an actuator arm coupled between the MEMS actuator and the moveable mirror, the actuator arm having a third stopper attached thereto, the third stopper located between the first stopper and the second stopper;
the capacitive sensing circuit determines a first measured capacitance at a first reference position of the moveable mirror when the third stopper is abutting the first stopper;
the capacitive sensing circuit determines a second measured capacitance at a second reference position of the moveable mirror when the third stopper is abutting the second stopper; and
the calibration module uses the first measured capacitance at the first reference position and the second measured capacitance at the second reference position to determine the correction amount.

6. The MEMS apparatus of claim 5, further comprising:
a wide band light source for producing a wide band light beam;
an interferometer including the moveable mirror and further including:
  a beam splitter optically coupled to receive the wide band light beam and to split the wide band light beam into a first interfering beam and a second interfering beam;
  a fixed mirror optically coupled to receive the first interfering beam and to reflect the first interfering beam back towards the beam splitter to produce a first reflected interfering beam;
  the moveable mirror optically coupled to receive the second interfering beam and to reflect the second interfering beam back towards the beam splitter to produce a second reflected interfering beam, the displacement of the moveable mirror producing an optical path length difference between the first and second interfering beams equal to twice the displacement; and
  a detector optically coupled to detect an interference pattern produced as a result of interference between the first reflected interfering beam and the second reflected interfering beam;

the capacitive sensing circuit determines a third measured capacitance at a third reference position of the moveable mirror corresponding to a center burst of the interference pattern;

the capacitive sensing circuit determines a fourth measured capacitance at a fourth reference position of the moveable mirror corresponding to zero actuation applied to the moveable mirror by the MEMS actuator; and the calibration module uses the first measured capacitance at the first reference position, the second measured capacitance at the second reference position, the third measured capacitance at the third reference position and the fourth measured capacitance at the fourth reference position to determine the correction amount.

7. The MEMS apparatus of claim 1, further comprising:

a fixed structure having a first side and a second side opposite the first side, each of the first side and the second side including a plurality of capacitive sensing points with known spacing therebetween;

an actuator arm coupled between the MEMS actuator and the moveable mirror and moveable between the first side and the second side of the fixed structure, the actuator arm having a plurality of capacitive fingers with known spacing therebetween; and the capacitive sensing circuit is coupled to the fixed structure and the actuator arm to measure a capacitance variation signal indicative of a change in capacitance between the capacitive sensing points and the capacitive fingers as the moveable mirror moves, wherein peaks in the capacitance variation signal correspond to physical reference points of the actuator arm at which a minimum offset is present between the capacitive sensing points and the capacitive fingers, ones of the two or more known positions of the moveable mirror being determined at the physical reference positions of the actuator arm.

8. The MEMS apparatus of claim 7, wherein the capacitive sensing circuit continuously measures a respective capacitance between the capacitive sensing points and the capacitive fingers as the moveable mirror moves to further determine zero crossings of the capacitance variation signal, the zero crossings corresponding to additional physical reference positions of the actuator arm at which a maximum offset is present between the capacitive sensing points and the capacitive fingers, additional ones of the two or more known positions of the moveable mirror being determined at the additional physical reference positions of the actuator arm.

9. The MEMS apparatus of claim 8, wherein:

the capacitive sensing circuit further determines respective actual capacitances of the MEMS actuator at each of the zero crossings and the peaks; and the calibration module determines the correction amount based on the actual capacitances of the MEMS actuator and the two or more known positions.

10. The MEMS apparatus of claim 1, wherein the MEMS actuator is an electrostatic actuator having two plates, the capacitive sensing circuit sensing the current capacitance between the two plates.

11. The MEMS apparatus of claim 10, wherein the MEMS actuator is an electrostatic comb drive actuator.

12. The MEMS apparatus of claim 1, wherein the capacitive sensing circuit includes a capacitance-to-voltage converter for receiving the current capacitance and producing an output voltage proportional to the capacitance.

13. A Micro Electro-Mechanical System (MEMS) interferometer system, comprising:

an interferometer including a moveable mirror optically coupled to receive and reflect light;

a MEMS actuator coupled to the moveable mirror to cause a displacement thereof, the MEMS actuator having a variable capacitance; a memory maintaining a table mapping capacitance of the MEMS actuator to position of the moveable mirror;

a capacitive sensing circuit coupled to the MEMS actuator for sensing a current capacitance of the MEMS actuator;

a digital signal processor for accessing the table to determine a current position of the moveable mirror based on the current capacitance of the MEMS actuator; and a calibration module for determining respective actual capacitances of the MEMS actuator at two or more known positions of the moveable mirror to determine a correction amount to be applied to the current position of the moveable mirror;

wherein the two or more known positons of the moveable mirror correspond to positions at which the moveable mirror is not in contact with another object;

wherein the digital signal processor further produces a corrected current position of the moveable mirror using the correction amount.

14. The MEMS interferometer system of claim 13, wherein the interferometer further includes:

a beam splitter optically coupled to receive an incident beam and to split the incident beam into a first interfering beam and a second interfering beam;

a fixed mirror optically coupled to receive the first interfering beam and to reflect the first interfering beam back towards the beam splitter to produce a first reflected interfering beam;

the moveable mirror optically coupled to receive the second interfering beam and to reflect the second interfering beam back towards the beam splitter to produce a second reflected interfering beam; and a detector optically coupled to detect an interference pattern produced as a result of interference between the first reflected interfering beam and the second reflected interfering beam;

wherein the displacement of the moveable mirror produces an optical path length difference between the first and second interfering beams equal to twice the displacement.

15. The MEMS interferometer system of claim 13, wherein:

the table represents a capacitance sensing curve;

the calibration module compares the actual capacitances of the MEMS actuator to corresponding respective capacitances within the table at the two or more known positions to calculate respective errors between the measured actual capacitances and the corresponding capacitances within the table;

the calibration module extrapolates a corrected capacitance sensing curve using the capacitance sensing curve and the calculated errors; and the calibration module uses the corrected capacitance sensing curve to determine the correction amount to be applied to the current position.

16. The MEMS interferometer system of claim 14, further comprising:

a wide band light source for producing a wide band light beam;

the capacitive sensing circuit determines a first measured capacitance at a first reference position of the moveable mirror corresponding to a center burst of the interference pattern;

the capacitive sensing circuit determines a second measured capacitance at a second reference position of the moveable mirror corresponding to zero actuation applied to the moveable mirror by the MEMS actuator; and the calibration module uses the first measured capacitance at the first reference position and the second measured capacitance at the second reference position to determine the correction amount.

17. The MEMS interferometer system of claim 14, further comprising:

a fixed structure having a first stopper at a first end thereof and a second stopper at a second end thereof;

an actuator arm coupled between the MEMS actuator and the moveable mirror, the actuator arm having a third stopper attached thereto, the third stopper located between the first stopper and the second stopper;

the capacitive sensing circuit determines a first measured capacitance at a first reference position of the moveable mirror when the third stopper is abutting the first stopper;

the capacitive sensing circuit determines a second measured capacitance at a second reference position of the moveable mirror when the third stopper is abutting the second stopper; and the calibration module uses the first measured capacitance at the first reference position and the second measured capacitance at the second reference position to determine the correction amount.

18. The MEMS interferometer system of claim 17, further comprising:

a wide band light source for producing a wide band light beam;

the capacitive sensing circuit determines a third measured capacitance at a third reference position of the moveable mirror corresponding to a center burst of the interference pattern;

the capacitive sensing circuit determines a fourth measured capacitance at a fourth reference position of the moveable mirror corresponding to zero actuation applied to the moveable mirror by the MEMS actuator; and the calibration module uses the first measured capacitance at the first reference position, the second measured capacitance at the second reference position, the third measured capacitance at the third reference position and the fourth measured capacitance at the fourth reference position to determine the correction amount.

19. The MEMS interferometer system of claim 13, further comprising:

a fixed structure having a first side and a second side opposite the first side, each of the first side and the second side including a plurality of capacitive sensing points with known spacing therebetween;

an actuator arm coupled between the MEMS actuator and the moveable mirror and moveable between the first side and the second side of the fixed structure, the actuator arm having a plurality of capacitive fingers with known spacing therebetween; and the capacitive sensing circuit is coupled to the fixed structure and the actuator arm to measure a capacitance variation signal indicative of a change in capacitance between the capacitive sensing points and the capacitive fingers as the moveable mirror moves, wherein peaks in the capacitance variation signal correspond to physical reference positions of the actuator arm at which a minimum offset is present between the capacitive sensing points and the capacitive fingers, ones of the two or more known positions of the moveable mirror being determined at the physical reference positions of the actuator arm.

20. The MEMS interferometer system of claim 19, wherein:

the capacitive sensing circuit continuously measures a respective capacitance between the capacitive sensing points and the capacitive fingers as the moveable mirror moves to further determine zero crossings of the capacitance variation signal, the zero crossings corresponding to additional physical reference positions of the actuator arm at which a maximum offset is present between the capacitive sensing points and the capacitive fingers, additional ones of the two or more known positions of the moveable mirror being determined at the additional physical reference positions of the actuator arm;

the capacitive sensing circuit further determines respective actual capacitances of the MEMS actuator at each of the zero crossings and the peaks;

the calibration module determines reference positions of the moveable mirror at each of the zero crossings and the peaks; and the calibration module determines the correction amount based on the actual capacitances of the MEMS actuator and the two or more known positions.

21. The MEMS interferometer system of claim 13, wherein the interferometer is a Fourier Transform Infrared (FTIR) spectrometer.

* * * * *